INVENTORS
EBERHARD WEIGERT
WINFRIED TAUSCH

July 22, 1969    E. WEIGERT ET AL    3,456,623
SUCTION SYSTEM FOR ROTARY PISTON INTERNAL COMBUSTION ENGINES
Filed June 2, 1967    2 Sheets-Sheet 2

INVENTORS
EBERHARD WEIGERT
WINFRIED TAUSCH

United States Patent Office 3,456,623
Patented July 22, 1969

3,456,623
SUCTION SYSTEM FOR ROTARY PISTON INTERNAL COMBUSTION ENGINES
Eberhard Weigert, Karl-Marx-Stadt, and Winfried Tausch, Zwickau, Germany, assignors to Veb Sachsenring Automobilwerke Zwickau, Zwickau, Germany
Filed June 2, 1967, Ser. No. 643,167
Int. Cl. F02b 53/06
U.S. Cl. 123—8                               5 Claims

ABSTRACT OF THE DISCLOSURE

A rotary piston type of internal combustion engine having a piston of trochoidal configuration and an engine housing provided with an intermediate portion circumferentially surrounding the piston and having an inner surface which defines a trochoidal path of movement for the piston. The housing also has a pair of side portions which engage the intermediate portion thereof to define therewith a piston chamber in which the piston of the engine is housed, and these side portions support the rotary main shaft for rotation by way of suitable bearings which are carried by the side portions of the housing, the main shaft having within the piston chamber an eccentric portion which coacts with the trochoidal piston. The side portions of the engine housing are respectively formed at their inner surfaces which are directed toward the piston chamber with elongated recesses of elliptical configuration communicating with the piston chamber, and both of the side portions of the engine housing are respectively formed with intake manifold passages which respectively communicate with ends of the elliptical recesses for directing fluid thereto to be delivered to the working chambers defined in the interior of the housing in the piston chamber thereof. The intermediate housing portion is formed with a circumferential inlet for delivery of fluid to the piston chamber, and the side portions of the engine housing are respectively formed with additional passages communicating with this circumferential inlet and respectively communicating with ends of the elliptical recesses which are respectively opposed to those ends thereof which communicate with the intake manifold passages. In addition, the main shaft can carry at opposed side faces of the piston rotary blower discs which rotate with the main shaft and which are respectively situated within the elliptical recesses.

BACKGROUND OF THE INVENTION

The present invention relates to suction systems for rotary piston types of internal combustion engines having pistons of trochoidal configuration and having housings formed with suction inlet manifold passages in both of the side portions of the housing, these engines having drive mechanisms which are cooled by the fresh gas which is drawn into the engine.

Engines of this type are known with inlet passages formed in the side portions of the housing, wherein the fresh gas which is sucked in through these passages is guided in part through hollow spaces of the rotary piston and by way of inlet pockets in the opposed side portions of the housing to the working chamber in which the piston is located, while another part of the fresh gas which is drawn into the engine flows at a somewhat later instant during the operating cycle directly from the intake passages through a space which surrounds the end sealing surfaces of the piston into the side portions through an inlet pocket. It has already been proposed to provide a rotary piston engine of this type with a circumferential inlet instead of with side inlets, so as to unify the advantage of fresh-gas cooling of the drive mechanism with the high power output of an engine having a circumferential inlet.

It has also been proposed to provide an engine with a combination of side and circumferential inlets, so that the operating conditions can be improved under all load conditions. The first type of engine referred to above, which has only side inlets, has the disadvantage that as a result of the limited inlet cross section as well as a result of the heating and throttling of the stream of fresh gas within the drive mechanism, only a very poor filling of the working chamber can be achieved and thus the engine can have only an insufficient power capacity.

In the event that a circumferential inlet is provided according to another proposal as referred to above, then the disadvantage of a limited inlet cross section is indeed avoided but as a result of the rotary movement of the piston the gas column which is sucked in is continuously destroyed and thus the filling is undesirably throttled. A further disadvantage of the circumferential inlet type of engine resides in the fact that the overlapping of the inlet and outlet openings under partial-load operating conditions and low speeds of revolution result in intense thinning of the inflowing fresh fluid by the residual gases of combustion, and also the result is an unsteady operation of the engine.

The combination of circumferential and side inlets does indeed make it possible to improve the partial load operating conditions and to maintain the desired power capacity, but this construction has the disadvantage that upon opening of the circumferential inlet at high loads the stream of fresh gas through the side inlets is reduced to such an extent that the cooling of the drive mechanism is no longer sufficient and in a short time the engine stops operating.

SUMMARY OF THE INVENTION

It is a primary object of the present invention to provide, for rotary piston internal combustion engines, a construction which will eliminate the above drawbacks.

It is, thus, an object of the invention to provide a suction system, with a double side inlet arrangement and a fresh-gas cooled drive mechanism, which however makes it possible to have throughout the entire range of operating speeds and under all load conditions satisfactory operating conditions for the rotary piston internal combustion engine.

In particular, it is an object of the present invention to provide a construction of this type which will produce a cooling of the drive mechanism which becomes more intensive as the load increases.

In accordance with the present invention, these objects are achieved by providing the side portions of the engine housing with elongated elliptical recesses communicating with the piston chamber and directed toward the piston chamber while the suction inlets for the fluid drawn into the engine respectively communicate through the side portions of the housing with ends of these elliptical recesses, and additional inlet passages are provided in the side portions of the housing leading from opposed ends of the elliptical recesses, which are opposed to those which communicate with the above-mentioned suction inlets to a circumferential inlet.

It is furthermore a feature of the present invention to provide on the main shaft in the region of the opposed faces of the eccentric itself and/or the piston a pair of blower devices which are situated within the elliptical recesses of the side portions of the housing.

A further feature of the invention resides in providing at the circumferential inlet, which is closed when operating under partial load, a valve structure, situated adjacent the inner surface of the intermediate housing part which circumferentially surrounds the piston, this valve structure being automatically opened only under high-load operating conditions of the rotary piston engine, either by way of a carburetor linkage means or by way of a vacuum-operated diaphragm which is controlled by the vacuum in the carburetor.

A further feature of the invention resides in providing lubricating passages extending between the elliptical recesses and bearings for the crankshaft and piston.

The feature, of the present invention, of directing the intake passages to ends or central regions of the elliptical recesses in the side portions of the engine housing and the arrangement of additional inlet passages in the side portions of the housing extending from the opposite ends of the elliptical recesses results in cooling the largest possible end surface area of the piston with the fresh gas and at the same time providing it with lubricating medium which is suspended in the mixture which is drawn into the engine. The action of the cooling and lubricating medium as well as the speed of flow of the stream in which it is suspended is increased by arranging on the main shaft in the region of the end faces of the eccentric thereof and/or the piston, within the elliptical recesses, blower devices in the form of rotary fan wheels which rotate with the main shaft so that the flow of fluid into the intake passages at the central region of the elliptical recesses is particularly advantageous.

The branching of the passages to the circumferential inlet at the side inlet openings has the advantage, as compared to the presently known solution for cooling the piston with the opening at the circumferential inlet, of providing a cooling of the piston which becomes not poorer but instead more intensive as a result of the increased gas throughput in these recesses. The fresh gas which is sucked into the engine no longer flows through the piston but instead sweeps across its end surfaces, or side surfaces, without being throttled in this way. In the event that lubricating medium is mixed together with the fuel or fresh oil is metered into the engine, then as a result of the turbulence of the gas flow in the elliptical recesses and through the lubricating medium passages which extend to the bearings of the main shaft and piston, the lubrication of the drive mechanism components is reliably maintained so that an oil circulating cooling and lubrication can be eliminated.

By way of the additional circumferential inlet a good filling of the operating chamber under full load conditions and high speeds of rotation is reliably assured. In the event that the engine operates under idling conditions or under partial load, the valve at the circumferential inlet closes the latter, this valve being located in the region of the inner surface of the intermediate housing portion which circumferentially surrounds the piston. Through this latter expedient dead-spaces in which there is no gas movement are maintained at a minimum. The valve at the circumferential inlet is opened under conditions of increasing load by way of the linkage which operates the carburetor or in response to the increasing extent of vacuum in the carburetor under these conditions. The pair of side inlets provide good operating conditions for the rotary piston internal combustion engine under idling and partial load operating conditions in a highly reliable manner since the cross section of these side inlets is uncovered by the piston only when the discharge passage is closed, so that the portion of burned combustion gases is maintained considerably smaller than in the case of engines having only circumferential inlets and operating under similar idling or partial load conditions.

BRIEF DESCRIPTION OF THE DRAWINGS

The invention is illustrated by way of example in the accompanying drawings which form part of this application and in which.

DESCRIPTION OF PREFERRED EMBODIMENT

Figure 1:
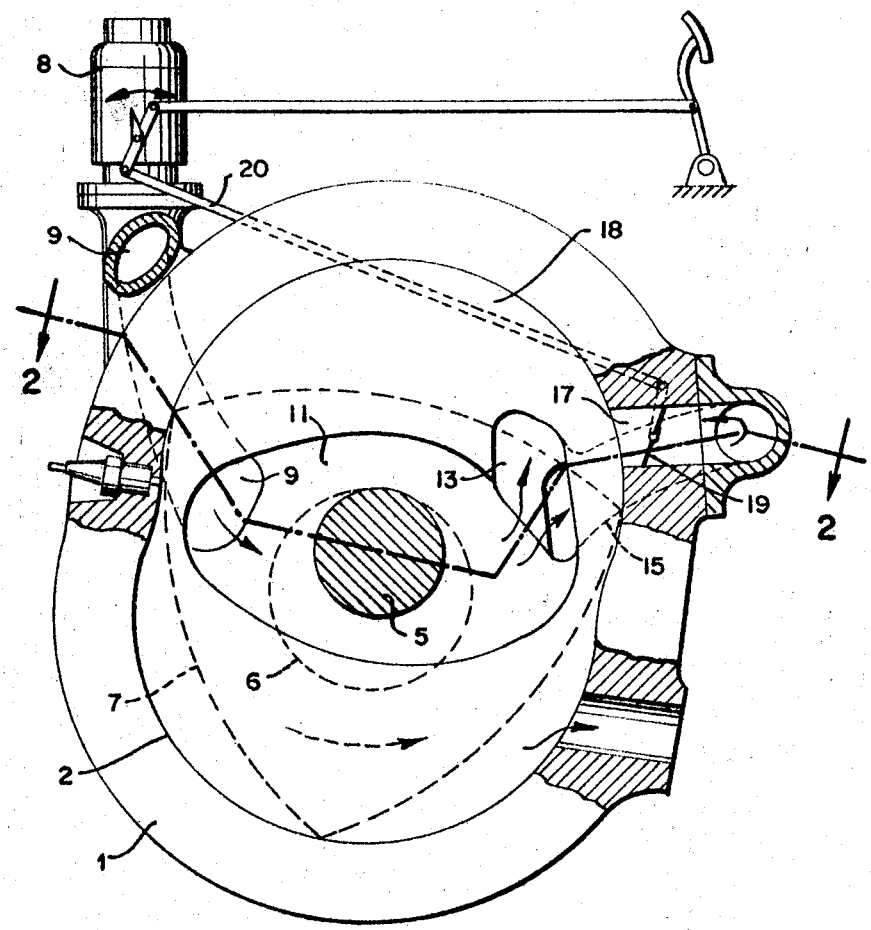
FIG. 1 is a longitudinal, sectional, partly schematic elevation of an engine according to the invention, the structure of FIG. 1 showing one of the side walls of the engine housing as it appears at its inner surface, the crankshaft and parts of the intermediate wall of the engine housing being shown in section in FIG. 1 while the carburetor operating linkage is schematically indicated.
Figure 3:
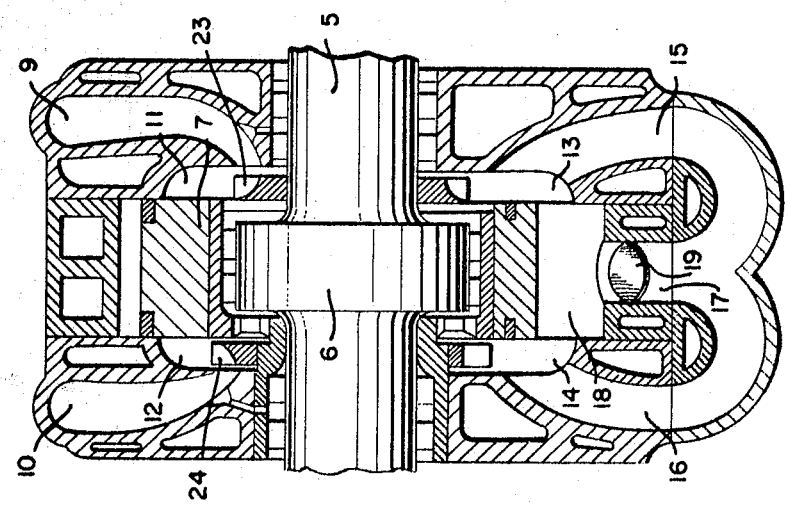
FIG. 3 shows an engine structure similar to that illustrated in FIG. 2 but provided with blower devices.
Figure 2:
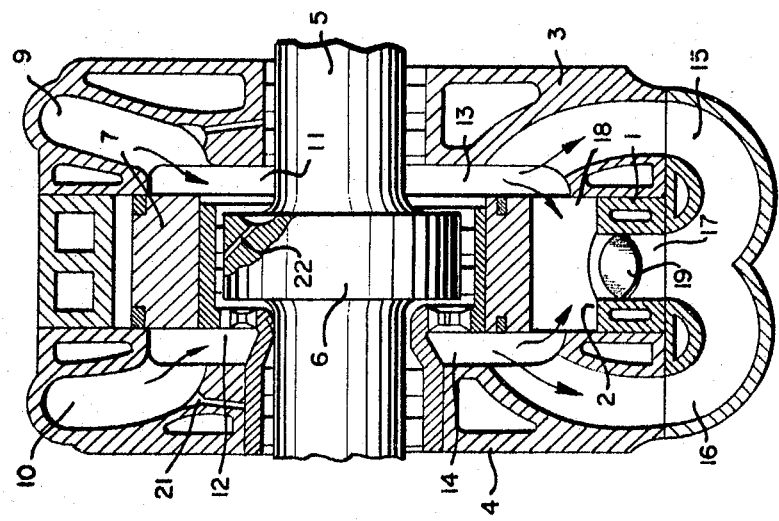
FIG. 2 is a sectional plan view of the structure of FIG. 1 taken along line 2—2 of FIG. 1 in the direction of the arrows.

Referring now to the drawings, there is shown in FIG. 1 a rotary piston type of internal combustion engine having a piston 7 of trochoidal configuration situated within an engine housing 1 which has an intermediate portion circumferentially surrounding the piston and having an inner surface 2 which defines the path along which the piston moves. The housing has, as shown in FIG. 2, a pair of opposed side portions 3 and 4 which coact with the intermediate circumferential housing portion to define the piston chamber in which the piston 7 is situated. These side portions of the housing carry bearings which in turn support the rotary main shaft 5 for rotary movement, and the main shaft 5 is provided within the piston chamber with an eccentric 6 which coacts with the rotary piston 7, the eccent ric 6 and the piston 7 both being carried by the main shaft 5.

The fuel-air mixture flows from the carburetor 8, shown in FIG. 1, through the suction inlet passages 9 and 10, which are respectively formed in the housing side portions 3 and 4, into elongated elliptical recesses 11 and 12 which are respectively formed at the inner surfaces of the side housing portions 3 and 4 and which have their interiors directed toward and communicating with the piston chamber in which the piston 7 is located. As is apparent from FIGS. 1 and 2, these suction inlet manifold passages 9 and 10 respectively communicate with ends of the elliptical recesses 11 and 12. Under idling or partial load operating conditions the fuel-air mixture is directed through additional side inlet openings 13 and 14, respectively situated at ends of the recesses 11 and 12 opposed to those which communicate with the inlets 9 and 10, and under full-load operating conditions through additional side passages 15 and 16 and the circumferential inlet 17 into the operating chamber 18 which forms the piston chamber in which the piston operates.

A butterfly valve 19 is situated at the circumferential inlet 17, which is formed in the intermediate housing portion, in the immediate vicinity of the inner surface 2 of the intermediate housing portion, so that losses resulting from the dead-spaces in which there is no gas circulation are maintained relatively low during partial-load operating conditions. With increasing load, preferably from the point of ⅔ full load and beyond, the valve 19 is opened by the carburetor operating linkage means 20 which has motion transmitted thereto by way of a motion-transmitting member located on the shaft of the throttling valve of the carburetor, so that when the latter is set to operate at ⅔ full load or greater loads, the angular position of the shaft of the throttling valve of the carburetor will act through the motion transmitting member connected thereto on the linkage 20 for opening the valve 19.

The lubricant which is mixed together with the fuel or the fresh oil which is metered into the engine provides for lubrication of the drive or transmission mechanism by way of lubricating medium passages 21, 22, which respectively extend from the elliptical recesses 11 and 12 to the bearings of the main shaft 5 and piston 7, as is apparent from FIG. 2.

In order to increase the cooling and lubricating action as well as to increase the speed of flow of the gas stream which is sucked into the engine the main shaft 5 carries within the elliptical recesses 11 and 12 a pair of blower devices 23 and 24 in the form of discs having the construction of fan wheels and provided at their peripheries with suitable vanes or buckets which as a result of rotation of these discs with the main shaft and within the recesses 11 and 12 produces better cooling and lubricating action as well as increased speed of flow of the mixture which is sucked into the engine.

What is claimed is:

1. In a suction system for a rotary piston internal combustion having at least one piston of trochoidal configuration, an engine housing having a pair of opposed side wall portions and an intermediate wall portion circumferentially surrounding a piston of the engine and defining with said side wall portions a hollow interior piston chamber in which the engine piston is located, said side wall portions of said housing respectively being formed at their inner side surface which are directed toward the piston chamber with elongated recesses of elliptical configuration directed toward and communicating with the piston chamber, and said side portions of said housing respectively being formed with intake passages for directing fluid into the piston chamber and said intake passages communicating with first ends of said elliptical recesses to deliver the fluid thereto, said intermediate housing portion being formed with a circumferential inlet leading into the piston chamber, and said side wall portions of said housing also being formed with additional passages respectively communicating with second ends of said elliptical recesses which are respectively opposed to those first ends thereof and respectively communicating with said circumferential inlet for directing fluid from said recesses through said additional passages to said circumferential inlet.

2. The combination of claim 1 and wherein said housing supports for rotary movement a main shaft and wherein a piston is situated in said piston chamber and driven by said rotary main shaft, and a pair of blower discs surrounding said main shaft and carried thereby respectively in the region of opposed side faces of said piston and situated within said elliptical recesses for rotary movement therein.

3. The combination of claim 1 and wherein said intermediate housing wall portion defines at its inner surface a trochoidal path for the piston and said circumferential inlet communicating with the piston chamber through said inner surface of said intermediate housing portion, and valve means located in said circumferential inlet at the region of said inner surface of said intermediate housing portion for controlling the flow of fluid through said circumferential inlet.

4. The combination of claim 3 and wherein a carburetor linkage means is operatively connected with said valve means for opening the latter under conditions where the engine operate at a relatively large load.

5. The combination of claim 1 and wherein a piston is located in said piston chamber and a main shaft is supported for rotary movement by said housing and drives said piston, bearing means for said main shaft and piston, and lubricating passage means extending from said elliptical recesses to said bearing means to deliver lubricant thereto.

References Cited

UNITED STATES PATENTS

| 1,434,446 | 11/1922 | McQueen | 91—56 X |
| 3,347,213 | 10/1967 | Froede | 123—8 |

FOREIGN PATENTS

| 993,769 | 6/1965 | Great Britain. |

WILLIAM E. WAYNER, Primary Examiner

U.S. Cl. X.R.

230—145